US009148501B2

(12) United States Patent
Korn (10) Patent No.: US 9,148,501 B2
(45) Date of Patent: Sep. 29, 2015

(54) SYSTEMS AND METHODS FOR HANDS-OFF CONTROL OF A MOBILE COMMUNICATION DEVICE

(71) Applicant: Talkler Labs, LLC, Belmont, MA (US)

(72) Inventor: Jeffrey Korn, Belmont, MA (US)

(73) Assignee: Talkler Labs, LLC, Belmont, MA (US)

( * ) Notice: Subject to any disclaimer, the term of this patent is extended or adjusted under 35 U.S.C. 154(b) by 28 days.

(21) Appl. No.: 13/933,730

(22) Filed: Jul. 2, 2013

(65) Prior Publication Data

US 2014/0004901 A1 Jan. 2, 2014

Related U.S. Application Data

(60) Provisional application No. 61/667,408, filed on Jul. 2, 2012.

(51) Int. Cl.
*H04M 1/00* (2006.01)
*H04M 1/725* (2006.01)
*H04M 3/42* (2006.01)

(52) U.S. Cl.
CPC ...... *H04M 1/72522* (2013.01); *H04M 1/72552* (2013.01); *H04M 2250/12* (2013.01); *H04M 2250/74* (2013.01)

(58) Field of Classification Search
CPC .......................... H04M 1/6041; H04M 1/6066
USPC .................................. 455/569.1–569.2, 418
See application file for complete search history.

(56) References Cited

U.S. PATENT DOCUMENTS

| | | | |
|---|---|---|---|
| 6,321,199 B1 * | 11/2001 | Theimer et al. | 704/275 |
| 2001/0003452 A1 * | 6/2001 | Linge | 345/179 |
| 2005/0219228 A1 * | 10/2005 | Alameh et al. | 345/173 |
| 2013/0150133 A1 * | 6/2013 | Alameh et al. | 455/569.1 |

* cited by examiner

*Primary Examiner* — Lee Nguyen
(74) *Attorney, Agent, or Firm* — Goodwin Procter LLP (57) ABSTRACT

Various embodiments of the invention provide techniques and supporting systems for allowing a user to interrupt operation of an application in a hands-free manner. In one example, a software application responds to a combination of pre-defined physical actions and/or verbal utterances from the user, and cause the mobile communication device to pause or change its actions.

35 Claims, 9 Drawing Sheets

Fig. 9

SYSTEMS AND METHODS FOR HANDS-OFF CONTROL OF A MOBILE COMMUNICATION DEVICE

CROSS-REFERENCE TO RELATED APPLICATIONS

This application claims priority to and the full benefit of U.S. Provisional Patent Application No. 61/667,408, filed on Jul. 2, 2012, the disclosure of which is incorporated by reference in its entirety.

FIELD OF THE INVENTION

This invention relates generally to acoustically and verbally interacting with a mobile communication device, and, more specifically, to controlling the operation of the device using a combination of predefined physical actions and verbal utterances from the user.

BACKGROUND OF THE INVENTION

Mobile devices have become ubiquitous in the everyday life of the general consumer. No longer are cellular phones, electronic personal data assistants, and Internet-connected hand-held devices reserved for the elite. As these devices become ingrained in consumers' daily routines, the use of the devices in situations in which safety, convenience and even appropriateness have become issues.

Users frequently need to interrupt or "barge in" during the operation of a software application in order to issue a command, pause or stop the application, and frequently need to do so without touching or looking directly at the device running the software. As one example, drivers routinely attempt to text, email and talk on their phone while driving. In other instances, the device may be out of reach (e.g., across the room, or inside a clothing pocket, backpack, briefcase or purse. The device may be purposefully hidden to avoid theft or snooping, such as when being used in a crowd or subway. The user may wish to avoid touching the device due to risks of dirtying, ruining or breaking the device, such as when jogging, biking, cooking, or performing manual labor. In some instances, the user may be visually impaired or otherwise physically challenged and need to rely on other means for interacting with the device.

The present state of the art, however, does not provide a simple and accurate method for a user to effectively "barge in" as a device and/or application on the device is in operation. While "hands-free" operation has made use of these devices somewhat more acceptable in certain instances, but the user experience is less than ideal.

Attempts to solve this challenge using voice-response and voice-recognition applications have not fully addressed the challenges users encounter during actual use of their devices. This situation may be exacerbated over speakerphone systems—such as are common in automobiles for hands-free cell phone use—because the mobile communication device microphone may be picking up both the voice of the user and other sounds. For example, speakerphone systems actually exacerbate the problem because their microphones do not discriminate among sounds in the acoustic environment, which sounds can include voices other than that of the user, as well as other background sounds such as road noise. Hence, "barging in" or "getting the attention" of a device by speaking a specifically predefined voice command is ineffective by virtue of the limited accuracy of conventional speech recognition.

Additionally, some mobile voice-controlled applications deliver audio content themselves, such as simulated speech (text-to-speech), music or video. Because many devices place the speaker used for delivering the audio content in close proximity to the microphone used for detecting voice commands, it is even more difficult for the device to hear and distinguish the user's voice over audio content it is delivering.

For "barging in" or "getting the attention" of a device via user voice command, the device must be constantly listening to all acoustic signals in the environment and attempting to detect a specifically predefined "barge in" command. Today's mobile devices and the applications that run on such devices perform much of their speech recognition using cloud-based services, so constantly listening can be prohibitively expensive for the user from a data usage standpoint under current mobile data plans offered by cell carriers. There is also a latency associated with transmitting every utterance and sound from the mobile device to the cloud for speech recognition processing, which makes the mobile device inadequately responsive to such spoken barge-in commands. Moreover, "barge-in" commands are useless if the data connection between the mobile device and the network is lost, and constant listening takes a dramatic toll on battery life.

What is needed, therefore, is a system and techniques that allow a user to effectively and reliably interrupt or "get the attention" of an application under a variety of acoustic conditions and in the presence of competing audio signals or noise, and without requiring access to a data network.

SUMMARY OF THE INVENTION

The disclosed methods and supporting systems enable a user to listen to and interact with an electronic device such as a mobile phone, remote control, tablet device, or other device controlled by embedded and/or installed software applications in an essentially hands-off and eyes-free manner. For example, the system responds to a combination of predefined physical actions and verbal utterances from the user, and causes the device to pause or change its actions.

Therefore, in a first aspect, a method for interrupting operation of an application on a mobile device includes receiving an audio signal at an audio sensor of the mobile device and polling additional sensor(s) other than the audio sensor for signals directed at the mobile device. A threshold filter is applied against each received signal, and a time interval during which the signals were received at the mobile device is measured. If at least some of the received signals meet their respective threshold and the time interval falls within a maximum timing threshold, operation of the application on the mobile device is interrupted or otherwise modified, otherwise the application is allowed to continue to operate without interruption.

The audio signal may be spoken utterances or other signals generated by physical motion of a user, such as a clap, snap, tap or knock. The filter applied to the audio signal may include a probabilistic filter that determines a likelihood that the spoken utterances matches a stored application command, and/or a probabilistic filter that determines whether the audio signal matches a stored sound profile. The additional sensors may include an ambient light sensor, an accelerometer, a gyroscope, a proximity sensor, and/or a camera. In such cases, the filters may determine whether a change in ambient light within a specified amount of time exceeds a predefined measurement, whether image data within the received signal substantially changes during a period of time, whether force data within the received signal substantially meets stored force criteria, whether spatial positioning data within the received signal substantially meets stored spatial positioning criteria, whether proximity data within the received signal measuring presence of nearby objects substantially meets stored proximity criteria, and/or whether movement data within the received signal substantially meets stored movement criteria.

In some cases all of the received signals may be required to meet their respective thresholds, whereas in other cases only some (e.g., a majority, at least two, etc.) may be required. Interruption of the operation of the device may include halting execution of an application on the device, initiating an operation within the application on the device, initiating an instance of another application on the device and, in some cases, further include receiving additional commands to execute functions in the application.

In another aspect, a system for interrupting operation of an application on a mobile device includes a processor for executing computer-executable instructions and a memory for storing the computer-executable instructions. When the instructions are executed by the processor, a user application is implemented that facilitates the interruption of an executing application. The application receives an audio signal at an audio sensor of the mobile device and polls additional sensor(s) other than the audio sensor for signals directed at the mobile device. A threshold filter is applied against each received signal and a time interval during which the signals were received at the mobile device is determined. If a subset of the received signals meets its respective threshold and the time interval falls within a maximum timing threshold, operation of the application is interrupted on the mobile device. If not, the application is permitted to continue to operate without interruption.

The audio signal may be spoken utterances or other signals generated by physical motion of a user, such as a clap, snap, tap or knock. The filter applied to the audio signal may include a probabilistic filter that determines a likelihood that the spoken utterances matches a stored application command, and/or a probabilistic filter that determines whether the audio signal matches a stored sound profile. The additional sensors may include an ambient light sensor, an accelerometer, a gyroscope, a proximity sensor, and/or a camera. In such cases, the filters may determine whether a change in ambient light within a specified amount of time exceeds a predefined measurement, whether image data within the received signal substantially changes during a period of time, whether force data within the received signal substantially meets stored force criteria, whether spatial positioning data within the received signal substantially meets stored spatial positioning criteria, whether proximity data within the received signal measuring presence of nearby objects substantially meets stored proximity criteria, and/or whether movement data within the received signal substantially meets stored movement criteria.

In some cases all of the received signals may be required to meet their respective thresholds, whereas in other cases only some (e.g., a majority, at least three, etc.) may be required. Interruption of the operation of the device may include halting execution of an application on the device, initiating an instance of another application on the device and, in some cases, further include receiving additional commands to execute functions in the application.

In another aspect, a method uses user-generated signals to trigger an operation within a software application operating on a physical device. The method includes receiving user-generated signals at various sensors of the device and validating that each of the user signals meets a respective threshold and that they were received within a specified time interval. If the signals meet their respective thresholds and the time interval falls within a maximum timing threshold, operation of the application is modified. Otherwise the application is allowed to continue to operate without interruption.

In various embodiments, the physical device may be a mobile telephone, a television, a tablet computer, a laptop computer, a global positioning satellite device, an alarm or an appliance.

In instances in which the audio signal is spoken utterances from a user of the mobile device, the threshold filter applied to the audio signal may include a probabilistic filter that determines a likelihood that the spoken utterances matches a stored application command. In instances in which the audio signal includes user-generated audio signals generated by a physical motion of the user, the threshold filter applied to the audio signal may include a probabilistic filter that determines whether the audio signal matches a stored sound profile. Modifying the operation of the application may include, for example, halting or interrupting the application, initiating the application, initiating an operation within the application, triggering a command, (e.g., launching an email or text message application, or answering the telephone), etc.

In embodiments in which the additional sensor comprises an ambient light sensor, the threshold filter applied to signals received at the ambient light sensor determines whether a change in ambient light within a specified amount of time exceeds a predefined measurement. In cases in which one of the additional sensors is a camera, the threshold filter applied to signals received at the camera determines whether image data within the received signal changes significantly over a period of time. Other versions may utilize an accelerometer and apply a threshold filter to determine whether movement data within the received signal meets a stored movement criteria.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
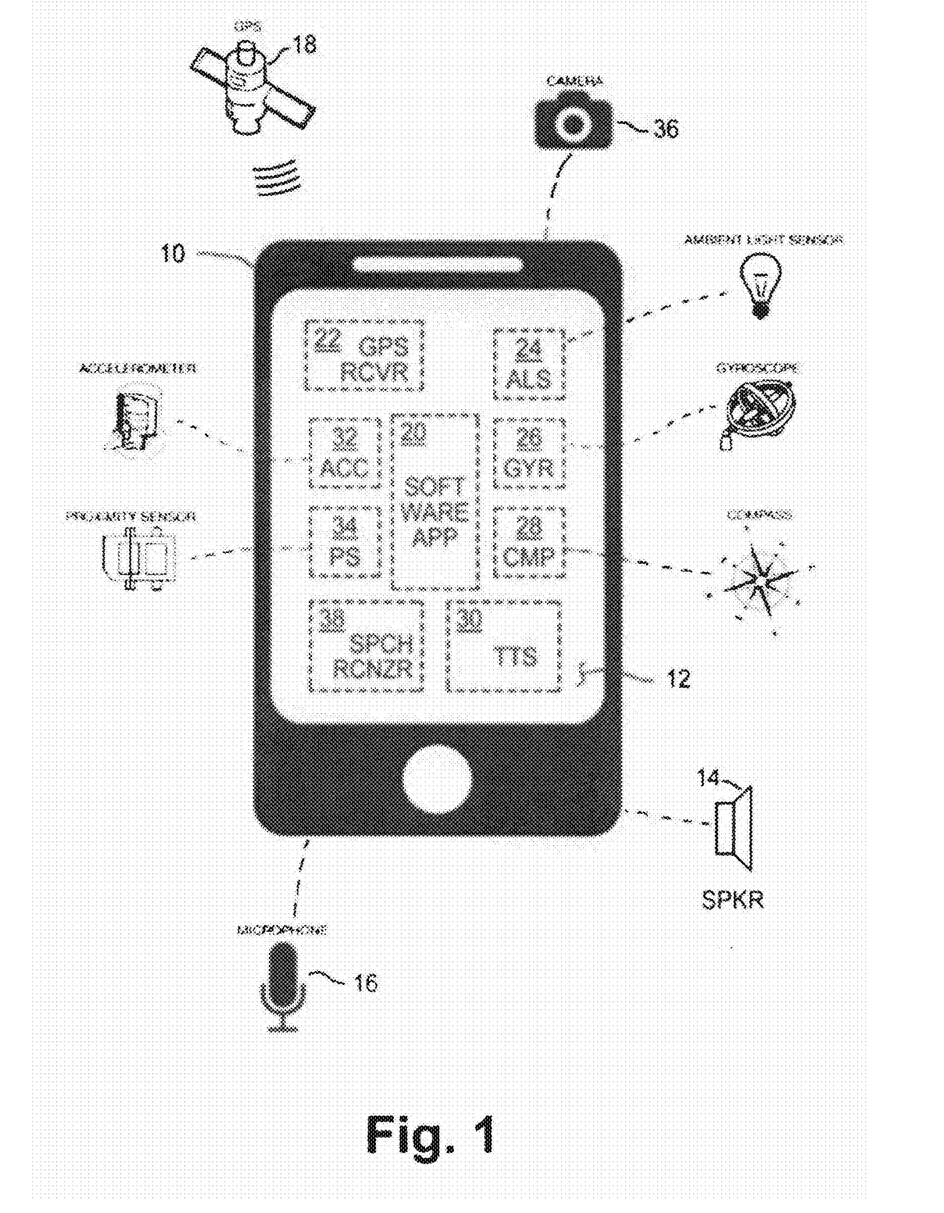
FIG. 1 is a diagrammatical illustration of a mobile communication device with the disclosed Software Application, in accordance with the present invention.

There is shown in FIG. 1 a mobile communication device 10, such as an IPHONE, a SMARTPHONE, an ANDROID, or a BLACKBERRY. The mobile communication device 10 may also include a cradle (not shown) or other physical mounting unit that supports the mobile communication device 10 in view of the user. This configuration allows the user to operate the mobile communication device 10 in an essentially hands-off and eyes-free mode.

The mobile communication device 10 may include a Software Application 20, in accordance with an exemplary embodiment of the present invention. The Software Application 20 functions in conjunction with a speech recognizer 38 to enable the user to listen to and interact with the mobile communication device 10, as described in greater detail below. In an exemplary embodiment, the user may interact with the mobile communication device 10 by selectively glancing at a display screen 12, listening to a speaker 14 in the mobile communication device 10 as the text-to-speech engine 30 is reading text aloud, and providing verbal prompts to a microphone 16 in the mobile communication device 10.

A typical mobile communication device may include one or more internal sensors to enhance functionality and provide additional features to the user. For example, the mobile communication device 10 may include one or more of: (i) a GPS receiver 22 for receiving positioning signals from one or more GPS satellites 18, (ii) an ambient light sensor 24 for detecting ambient light conditions, (iii) a gyroscope 26 for detecting device rotation, (iv) a compass 28 for detecting device orientation, (v) an accelerometer 32 for detecting device movement, and (v) a proximity sensor 34 for detecting the presence of nearby objects. The mobile communication device 10 may also include a built-in camera 36 for obtaining digital images and/or video.

Figure 2:
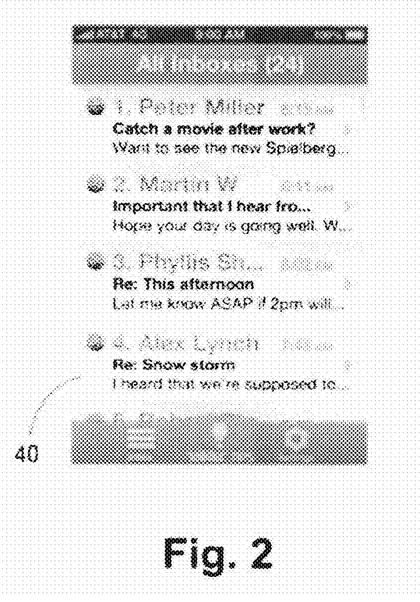
FIG. 2 is an illustration of a message list as may be presented on the display screen of the mobile communication device of FIG. 1.
Figure 3A:
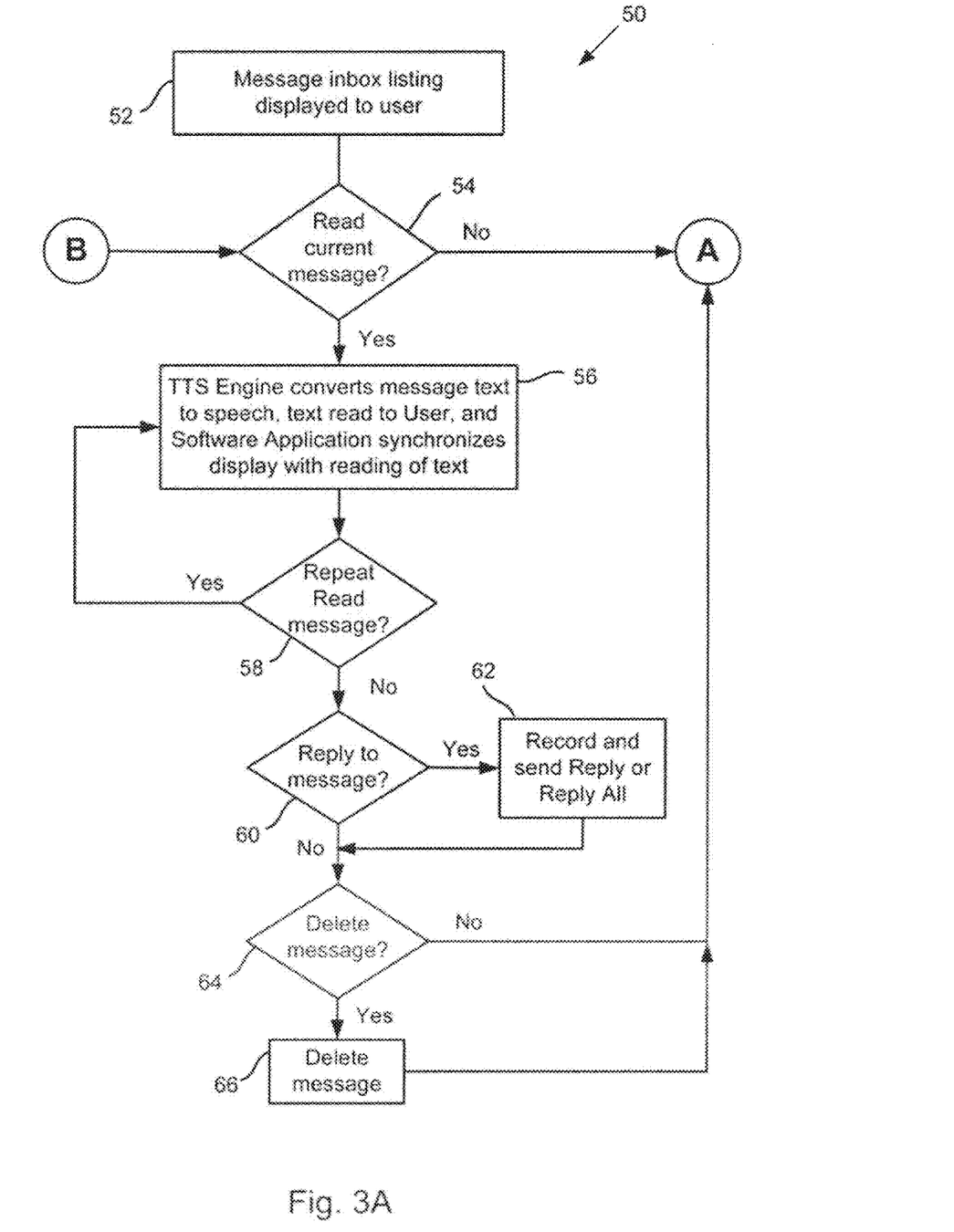
FIGS. 3A and 3B are flow diagrams illustrating operation of the Software Application, in accordance with the present invention.
Figure 3B:
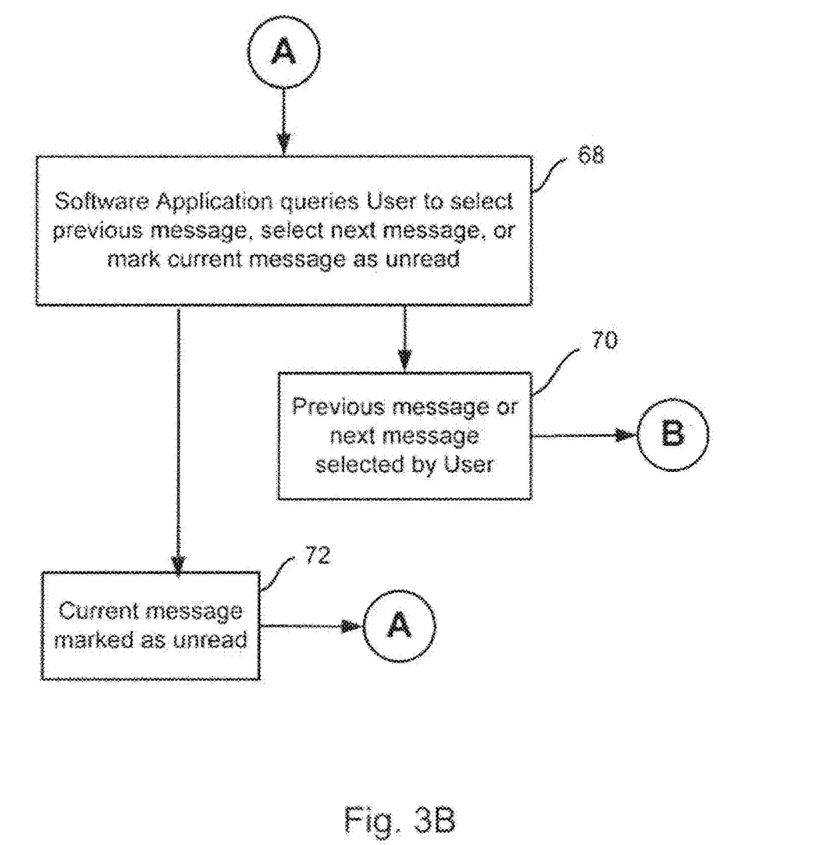

FIG. 2 shows a message inbox listing 40 as may be displayed in the display screen 12, as provided in step 52 of a flow diagram 50 shown in FIGS. 3A and 3B. In an exemplary embodiment, the Software Application 20 may function in conjunction with a text-to-speech (TTS) engine 30 and the speaker 14 to audibly inform the user of: (i) the time of receipt, (ii) the sender, (iii) the message subject, and/or (iv) other header information, for a received e-mail message, or other received communication.

The TTS engine 30 and the speaker 14 thus operate in conjunction with a scrolling visual display on the display screen 12, where the visual display uses teleprompter technology to provide a text display that is synchronized with the audio being generated by the TSS engine 30 and emitted by the speaker 14. As can be appreciated by one skilled in the art, text-to-speech technology is imperfect, and providing a synchronous teleprompter display in this manner allows the user to view words, such as proper names, which the text-to-speech technology might be mispronouncing. The user needs only to selectively glance at the text display in the display screen 12, and is thus not required to continually view the mobile communication device 10.

Figure 4:
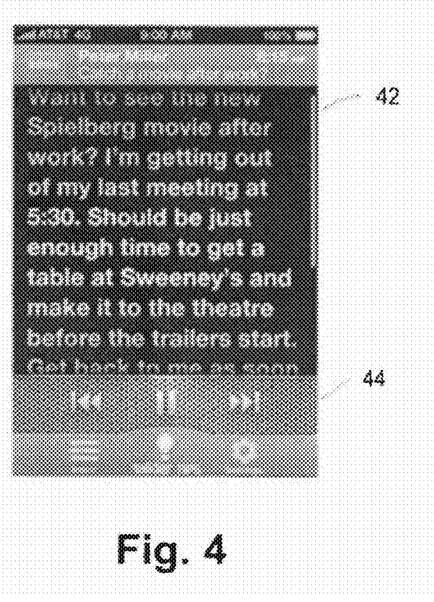
FIG. 4 is an illustration of the message list of FIG. 2 including a microphone icon.

For example, the mobile communication device 10 may output, via the speaker 14, an audio statement such as "You have 24 unread messages." A microphone icon 42 may appear in the message inbox listing 40, as shown in FIG. 4, to indicate that the Software Application 20 is ready to accept vocal instructions from the user. The mobile communication device 10 may also be directed by the user to "read out loud" the body of a selected message in the message inbox listing 40, at decision block 54.

If the user has elected to have the selected message read, the TTS engine 30 converts a portion of the message text to audible speech, at step 56. In the example provided, the user has selected the first message, as shown in FIG. 4, although the user can select any message, as described in greater detail below. The display screen 12 displays the initial portion of the message 42 along with control buttons 44. The TSS engine 30 converts the message text to speech, and the Software Application 20 displays the message text on the display screen 12 in synchronicity with the audio generated by the TSS engine 30.

The user may request that the Software Application 20 repeat the selected message, as decision block 58. The process returns to step 56 and the selected message is repeated. Otherwise, the user may decide whether to reply to the selected message, at decision block 60. If so, the Software Application 20 records the user's response, at step 62, and sends the audio file to one or more recipients having addresses listed in the selected message.

If the user elects to not respond to the selected message, at decision block 60, the user may decide to delete the selected message, at decision block 64. If not, the process moves to step 68. If the message is deleted, at step 66, the Software Application 20 queries the user whether to move to another message, at step 68. The user may elect to move ahead to the next message, or to move back to the previous message, at step 70. The process then returns to decision block 54 where the user may decide whether or not to read the currently-selected message.

If the user decides to mark the current message as unread, at step 72, the user may be queried by the Software Application 20, at step 68, as to whether another message is to be selected. If the user does not elect to have the message read, at decision block 54, the user may be queried by the Software Application 20, at step 68, as to whether the current message is to be marked unread.

As can be appreciated, the user experience is designed to be similar to that of speaking with a personal assistant or a trusted friend, and asking the assistant or friend to read to the user the received message or communication. The resultant interaction between the user and the mobile communication device 10 is thus conversational and intuitive.

If, and when, the user wishes to barge-in during any step of the process illustrated in the flow diagram 50, the disclosed method provides innovative input mechanisms to enable the user to reliably barge-in when the user has intended a barge-in, and to avoid initiating a barge-in scenario when the user has not intended a barge-in. As used herein, the action of "barge-in" comprises the response of the mobile communication device 10 to pre-established criteria by: (i) pausing or halting the operation of the TTS engine 30 and the scrolling visual display on the display screen 12, and (ii) responding to a command issued by the user after the barge-in criteria have been met.

In accordance with the disclosed method, when the user is accessing the mobile communication device 10, the Software Application 20 may be programmed to accurately recognize that the user should be allowed to barge-in if the user simultaneously utters a pre-defined barge-in phrase (e.g., "Hey System") while simultaneously providing a pre-defined gesture such that the camera 36 or other sensor(s) detect the user's gesture at the same time that the microphone 16 detects a valid pre-defined barge-in phrase.

It can be appreciated by one skilled in the art that a mobile communication device designed to halt operation when detecting a sound that is somewhat similar to a barge-in phrase, may return an unacceptable proportion of false positives. That is, such a device may halt operation even when the user did not provide the valid, pre-defined barge-in phrase, because the device may mistakenly interpret some other sound to be the barge-in phrase. For example, a barge-in phrase spoken by the user might be confused with a similar sound generated by a TTS engine, or by other people speaking within range of the microphone 16.

On the other hand, a mobile communication device designed to halt operation only when the mobile communication device response is assured of a high degree of confidence in detecting a near-perfect, matching utterance for the prescribed barge-in command, may return a preponderance of false negatives. Accordingly, such a mobile communication device may fail to halt operation, even when the user wants to pause the process, because the high degree of confidence has not been assured.

Thus, given a single utterance from the user, or given a physical movement by the user, either action alone might be interpreted by the Software Application 20 as an ambiguous command. In comparison, if both such actions occur essentially simultaneously, the Software Application 20 can more reliably interpret the combination of the two actions, as explained in greater detail below.

Under this solution, the mobile communication device probabilistically combines the simultaneous inputs of multiple sensors within a pre-specified time window (which may be user configurable), and uses the combined probability to determine with much greater accuracy whether or not the user has uttered an intended barge-in phrase. That is, the disclosed method functions to eliminate a preponderance of false positives and false negatives.

Figure 5:
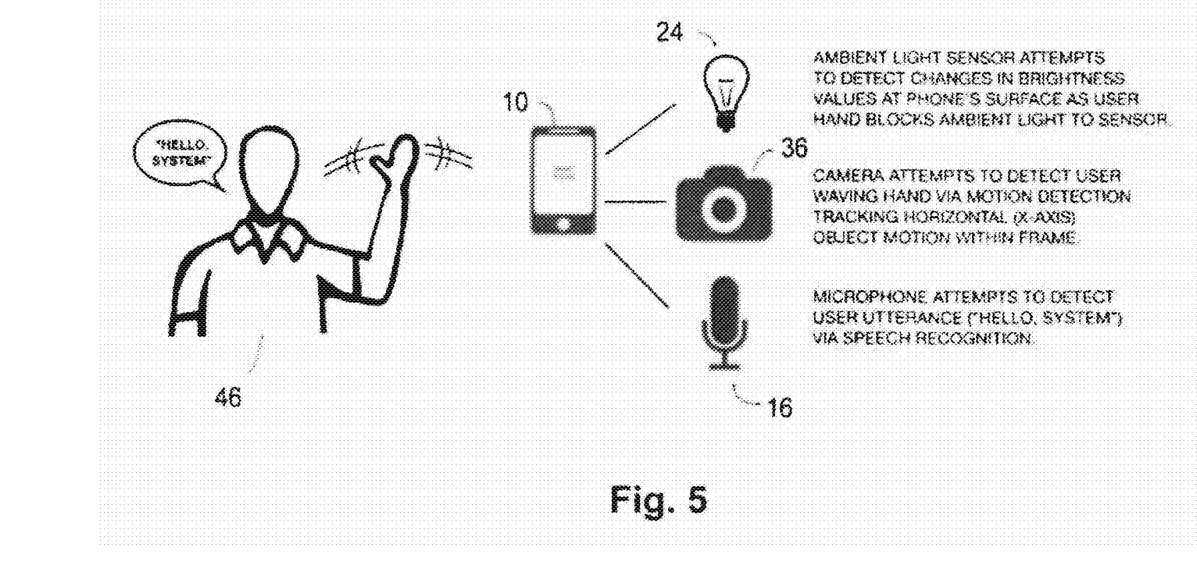
FIG. 5 is an example of a multi-sensor barge-in action, showing an ambient light sensor, a mobile device camera, and a microphone.

Advantageously, the Application Software 20 is designed to combine user actions in intuitive ways. For example, the act of waving to the mobile communication device 10 while saying "Hello, System" may be an intuitive combination for a user of the mobile communication device 10, since these are actions that mimic everyday human interaction. As shown in FIG. 5, the microphone 16 can detect the phrase "Hello, System" via the speech recognizer 38. The camera 36 can detect the user 46 waving and associated hand motion via image recognition technology. In a preferred embodiment, the image recognition technology (not shown) may be configured for particular sensitivity to horizontal movement.

The ambient light sensor 24 may be used to provide additional verification of a hand movement by detecting changes in brightness values proximate to the mobile communication device 10. This detection may be used to infer that the motion of the user's hand resulted in intermittent blockage of ambient light reaching the surface of the mobile communication device 10.

Figure 6:
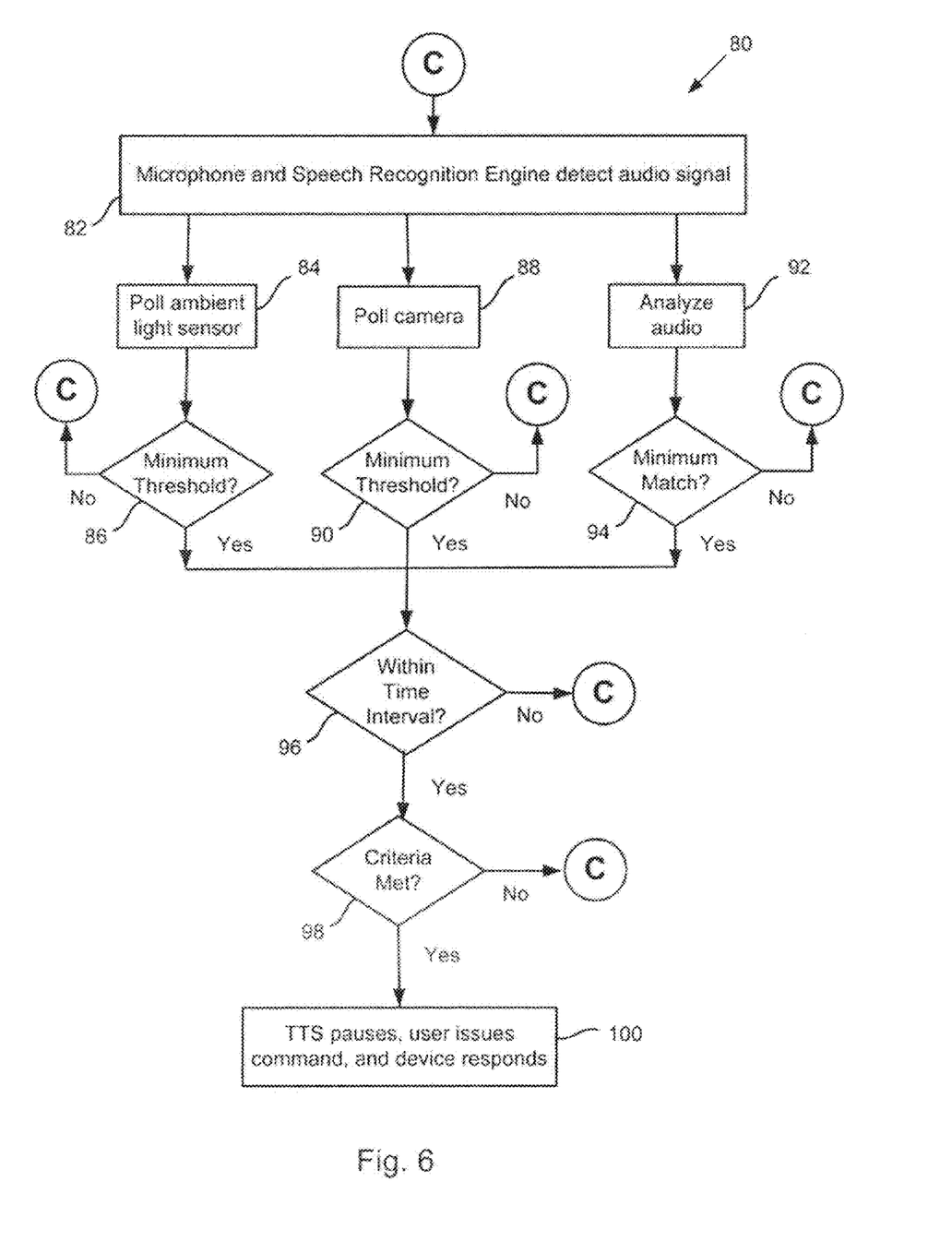
FIG. 6 is a flow diagram illustrating exemplary operation of the sensor devices of FIG. 5 with the Software Application.

FIG. 6 shows a flow diagram 80 that illustrates the general coordination of sensors as may be used to detect conditions for providing a barge-in. As the innovative operation illustrated by the flow diagram 50 proceeds, in FIGS. 3A and 3B, the microphone 16 and speech recognizer 30 continually monitors the ambient acoustic environment for audio signals corresponding to utterances of the user 46, at step 82.

When a candidate audio signal is detected, the ambient light sensor 24 (and/or other sensors) may be polled, at step 84, to determine if there has been a change in ambient brightness value. If any change in ambient brightness value is detected, an inquiry is made whether the change in brightness meets a pre-specified threshold value, at decision block 84. If the change in brightness does not meet the threshold, the process returns to step 82.

When the candidate audio signal is detected, the camera 36 may also be polled, at step 88, to determine if there has been any substantially horizontal movement detected within the field of view of the camera 36. If any detected movement does not meet pre-specified criteria, at decision block 90, the process returns to step 82. Similarly, when the candidate audio signal is detected, the candidate audio signal may be analyzed, at step 92, to determine if the audio signal comprises a close match, or a discernible speech pattern, to the pre-defined barge-in phrase. If the minimum criteria are not met, at decision block 94, the process returns to step 82.

When the change in brightness does meet the pre-specified threshold value, at decision block 84, and the detected movement does meet the pre-specified criteria, at decision block 90, and the audio signal comprises a close match to the pre-defined barge-in phrase, at decision block 94, then a determination is made, at decision block 96, as to whether at least two of the three criteria have been met. If not, the process returns to step 82. If at least two criteria have been met within a pre-specified time interval, at decision block 98, operation of the TTS 30 is paused, the user 46 is allowed to barge into the operation illustrated by the flow diagram 50, and the Software Application 20 listens for and responds to a command issued by the user, at step 100.

Figure 7:
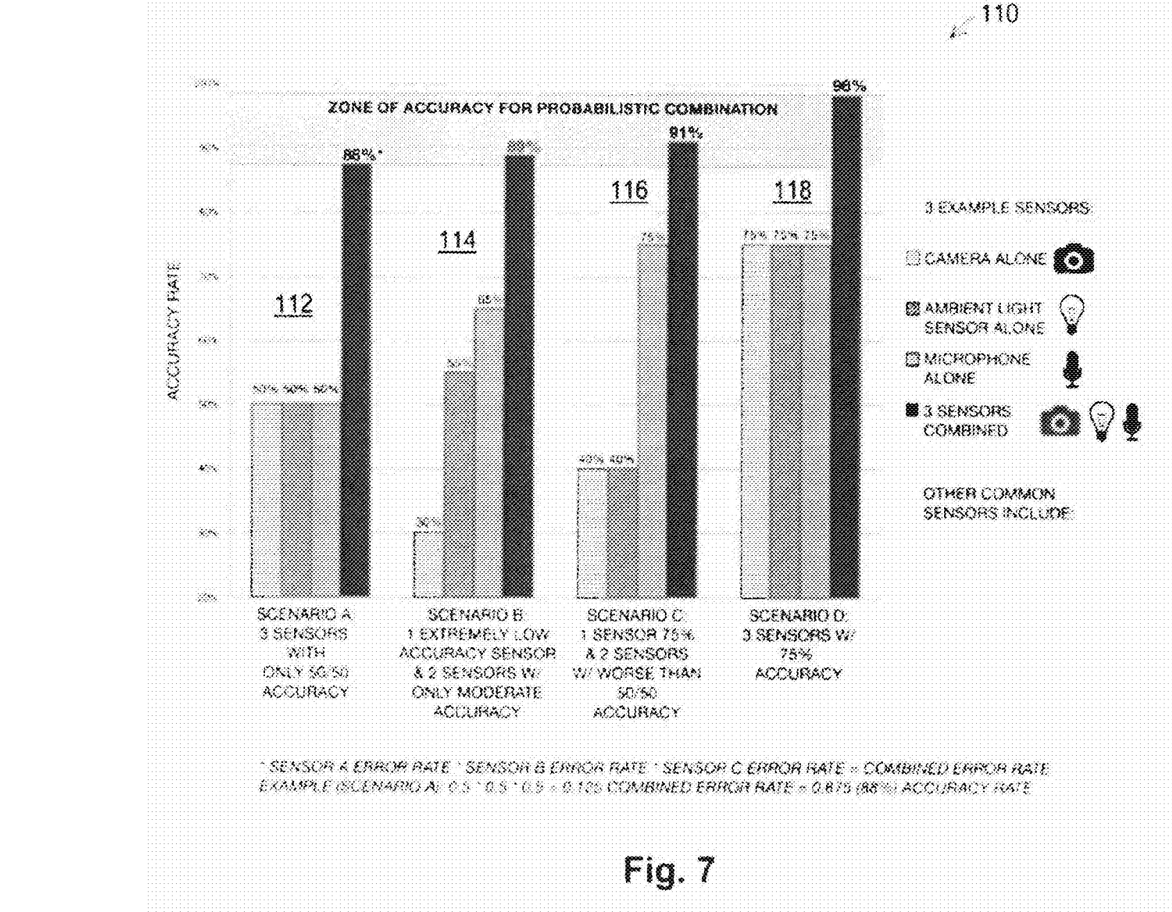
FIG. 7 is a bar graph used to provide an analytical basis for using two or more sensors to determine if a barge-in is to be allowed for the mobile communication device of FIG. 1.

FIG. 7 illustrates a bar graph 110 used to provide an analytical basis for using two or more sensors to determine if a barge-in is to be allowed for the mobile communication device 10. In a first bar graph cluster 112, accuracy parameters of 50% have been assigned to each of the camera 36, the ambient light sensor 24, and the microphone 16. The aggregate probability of correct detection for the accuracy parameters of the first bar graph cluster 112 can be shown to be about 88%.

In a second bar graph cluster 114, an accuracy parameter of 30% has been assigned to the camera 36, an accuracy parameter of 55% has been assigned to the ambient light sensor 24, and an accuracy parameter of 65% has been assigned to the microphone 16. The aggregate probability of correct detection for the accuracy parameters of the second bar graph cluster 114 can be shown to be about 89%.

In a third bar graph cluster 114, accuracy parameters of 40% have been assigned to the camera 36 and to the ambient light sensor 24, and an accuracy parameter of 75% has been assigned to the microphone 16. The aggregate probability of correct detection for the accuracy parameters of the third bar graph cluster 116 can be shown to be about 91%.

In a fourth bar graph cluster 118, accuracy parameters of 75% have been assigned to the camera 36, to the ambient light sensor 24, and to the microphone 16. The aggregate probability of correct detection for the accuracy parameters of the fourth bar graph cluster 118 can be shown to be about 98%.

In comparison, if the microphone 16 detects spoken barge-in commands (via speech recognition technology of the speech recognizer 38) with only 75% accuracy, then the Software Application 20 will incorrectly identify the barge-in phrase about 25% of the time by use of the microphone 16 alone. Likewise, if the camera 36 detects a visible command, such as the user waving at the camera (via the image recognition technology) with only 75% accuracy, then the Software Application 20 may incorrectly identify the command about 25% of the time through use of the camera 36 alone.

However, if the Software Application 20 is designed to detect simultaneously both a spoken barge-in command from the microphone 16, and a visible wave command from the camera 36—within a specified time window such as about 2.0 seconds—then the combined probability that the Software Application 20 may incorrectly identify the intended barge-in phrase is reduced to about 6.25% (that is, 0.25×0.25=0.0625).

Figure 8:
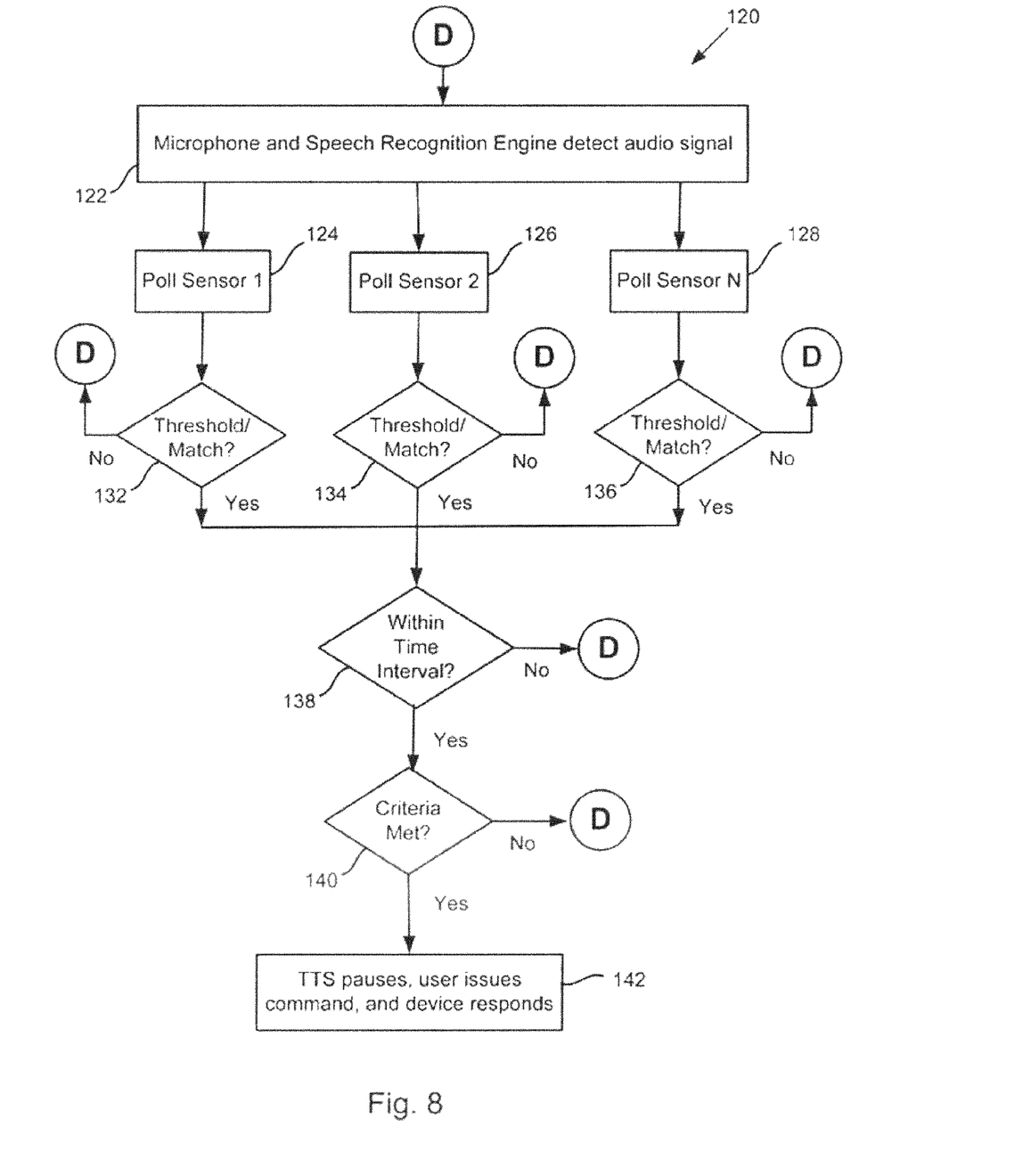
FIG. 8 is a flow diagram illustrating general operation of the sensor devices of FIG. 5 with the Software Application.

In general, the disclosed process may be practiced with any combination of two or more of the above-described sensors and criteria, as illustrated in a flow diagram 120, in FIG. 8. The microphone 16 and the speech recognizer 30 continually monitor the ambient acoustic environment for audio signals corresponding to utterances of the user 46, at step 122. When a candidate audio signal is detected, a first sensor may be polled, at step 124, a second sensor may be polled, at step 126, and so on to the polling of an N-th sensor, at step 128, to determine if there has been a change in respective sensor values or audio parameters.

If any changes in the polling criteria are detected, at respective decision blocks 132, 134, 136, then a determination is made, at decision block 138, as to whether the changes have occurred within a pre-specified time interval. If so, the process continues to decision block 140 to determine whether two or more of the criteria have been met. If not, the process returns to step 122. Otherwise, operation of the TTS 30 may be paused, the user 46 is allowed to barge into any stage of the operation illustrated by the flow diagram 50, and the Software Application 20 listens for and responds to a command issued by the user, at step 142.

In an exemplary embodiment, the disclosed process may be further practiced to provide a more reliable operation of the mobile communication device 10, in response to user input. As shown in a flow diagram 150, in FIG. 9, the mobile communication device 10 may react to user input(s) after validating that one or more sensor detections have also occurred. For example, the mobile communication device 10 may complete a current task, such as opening a selected message, and then may enter a "user response mode" to await an audio command and physical response(s) from the user 46, at step 152.

Figure 9:
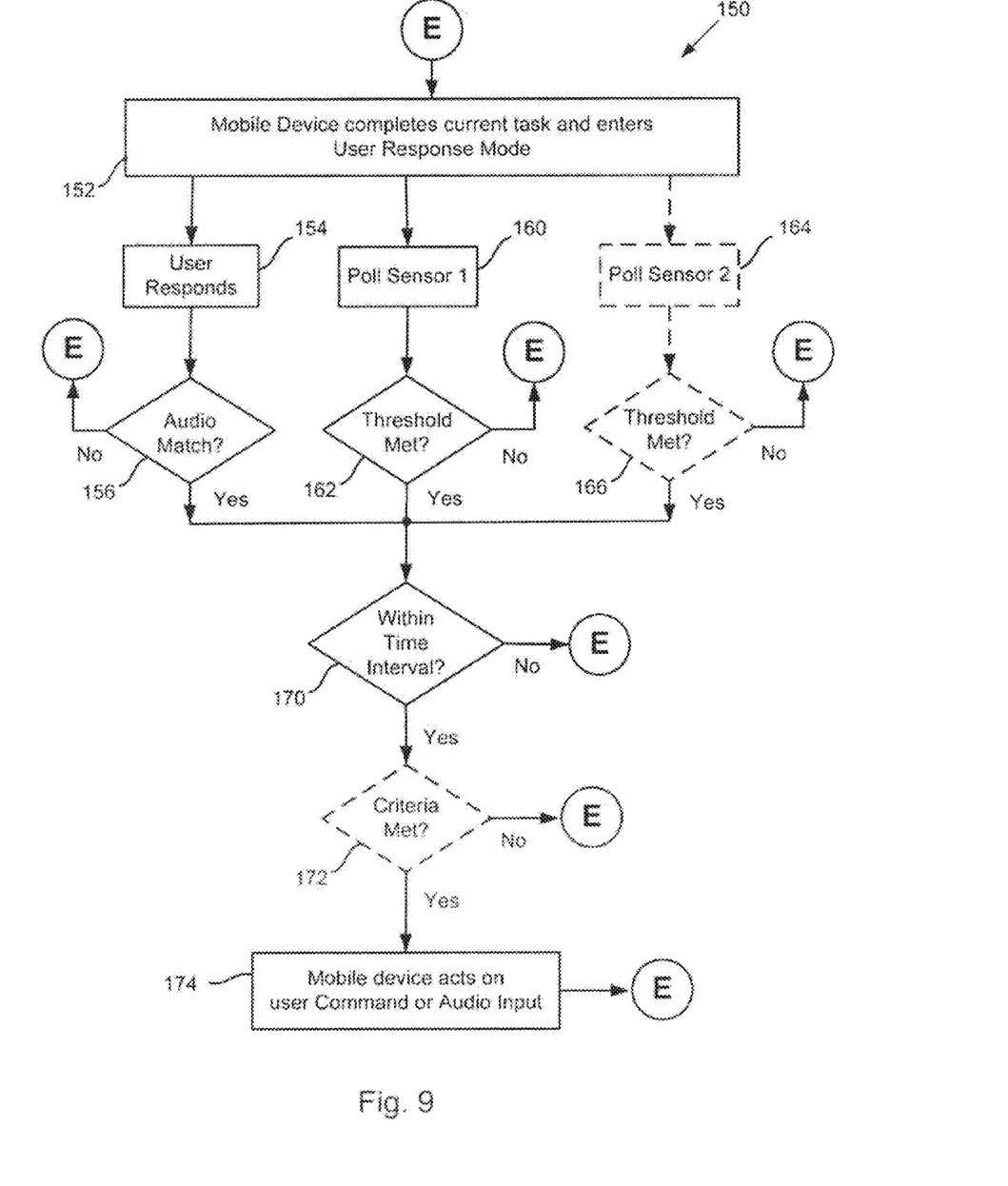
FIG. 9 is a flow diagram illustrating an alternative operation of the sensor devices of FIG. 5 with the Software Application.

When the user 46 has responded, at step 154, the Software Application 20 may determine if the audio input matches a pre-specified command or directive, at decision block 156. If, according to the speech recognizer 30, the received audio input does not match a pre-specified audio segment, the process returns to step 152. Concurrently, the Software Application 20 may poll a first sensor, at step 160, and determine if a pre-established threshold for the first sensor has been met, at decision block 162. If not, the process returns to step 152. The first sensor may comprise the ambient light sensor 24, the gyroscope 26, the compass 28, the accelerometer 32, the proximity sensor 34, the mobile device camera 36, or the microphone 16. For example, the Software Application 20 may function in concert with the ambient light sensor 24 to determine if the user has waved his hand.

The Software Application 20 may optionally poll a second sensor, at step 164, to determine if a pre-established threshold for the second sensor has been met, at decision block 166. If not, the process returns to step 152. The optional second sensor may comprise the ambient light sensor 24, the gyroscope 26, the compass 28, the accelerometer 32, the proximity sensor 34, the mobile device camera 36, or the microphone 16. In an alternative embodiment, a third optional sensor may also be polled.

If the audio input has produced a match, and if the one or more sensors have met threshold requirements, a determination is made, at decision block 170, as to whether the detected events have occurred within a pre-specified time interval. If so, the process may continue to optional decision block 172 to determine whether the combination of detected events has met a pre-specified criterion. For example, a command to go to the next message may also require that the user also gesture with his hand. If the expected combination of actions is not detected, the process returns to step 152. Otherwise, the mobile communication device 10 and the Software Application 20 may act on the command or other audio input provided by the user, at step 174.

The Software Application 20 may be implemented on hardware such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The Software Application 20 may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories may store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various embodiments, the devices include a web browser, client application software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some embodiments, the devices include client application software. The client application software provides functionality to the device that provides for the implementation and execution of the features described herein. The client application software may be implemented in various forms, for example, it may be in the form of a web page, widget, and/or Java, JavaScript, .Net, Silverlight, C++, C, Flash, and/or other applet or plug-in that is downloaded to the device and runs in conjunction with the web browser. The client application software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software.

A communications network may connect the devices with one or more servers and/or with each other. The communication may take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture. In other cases the invention may take the form of a downloadable application made available in either a public or private application platform.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for interrupting operation of an application on a mobile device, the method comprising the steps of:
   receiving an audio signal at an audio sensor of the mobile device;
   polling at least one additional sensor other than the audio sensor for signals directed at the mobile device;
   applying a threshold filter against each received signal;
   determining a time interval during which the signals were received at the mobile device; and
   if a subset of the received signals meets its respective threshold and the time interval falls within a maximum timing threshold, interrupting the operation of the application on the mobile device, and otherwise allowing the application to continue to operate without interruption.

2. The method of claim 1 wherein the audio signal comprises spoken utterances from a user of the mobile device.

3. The method of claim 1 wherein the threshold filter applied to the audio signal comprises a probabilistic filter that determines a likelihood that the spoken utterances match a stored application command.

4. The method of claim 1 wherein the audio signal comprises user-generated audio signals generated by a physical motion of the user.

5. The method of claim 4 wherein the threshold filter applied to the audio signal comprises a probabilistic filter that determines whether the audio signal substantially matches a stored sound profile.

6. The method of claim 1 wherein the at least one additional sensor comprises an ambient light sensor.

7. The method of claim 1 wherein the threshold filter applied to signals received at the ambient light sensor determines whether a change in ambient light within a specified amount of time exceeds a predefined measurement.

8. The method of claim 1 wherein the at least one additional sensor comprises a camera.

9. The method of claim 8 wherein the threshold filter applied to signals received at the camera determines whether image data within the received signal has substantially changed during a predefined time duration.

10. The method of claim 1 wherein the at least one additional sensor comprises an accelerometer.

11. The method of claim 10 wherein the threshold filter applied to signals received at the accelerometer determines whether movement data within the received signal substantially meets a stored movement criteria.

12. The method of claim 1 wherein the at least one other sensor comprises an ambient light sensor and a camera, and the threshold filter applied to signals received at the ambient light sensor determines whether a change in ambient light within a specified amount of time exceeds a predefined measurement and wherein the threshold filter applied to signals received at the camera determines whether image data within the received signal has substantially changed during a predefined time duration.

13. The method of claim 1 wherein the time interval comprises a maximum time duration.

14. The method of claim 1 wherein the subset of the received signals comprises all of the received signals.

15. The method of claim 1 wherein the subset of the received signals comprises a minimum number of the received signals.

16. The method of claim 1 wherein interruption of the operation of the mobile device comprises halting execution of an application.

17. The method of claim 16 further comprising initiating an instance of an alternate application.

18. The method of claim 1 further comprising receiving an audible application command for causing execution of a function within the application.

19. A system for interrupting operation of an application on a mobile device, the system comprising:
- a processor for executing computer-executable instructions; and
- a memory for storing the computer-executable instructions, that when executed by the processor implements a user application, wherein the user application facilitates the interruption of an executing application by:
- receiving an audio signal at an audio sensor of the mobile device;
- polling at least one additional sensor other than the audio sensor for signals directed at the mobile device;
- applying a threshold filter against each received signal;
- determining a time interval during which the signals were received at the mobile device; and
- if a subset of the received signals meets its respective threshold and the time interval falls within a maximum timing threshold, interrupting the operation of the application on the mobile device, and otherwise allowing the application to continue to operate without interruption.

20. The system of claim 19 wherein the audio signal comprises spoken utterances from a user of the mobile device.

21. The system of claim 20 wherein the threshold filter applied to the audio signal comprises a probabilistic filter that determines a likelihood that the spoken utterances match a stored application command.

22. The system of claim 19 wherein the audio signal comprises user-generated audio signals generated by a physical motion of the user.

23. The system of claim 22 wherein the threshold filter applied to the audio signal comprises a probabilistic filter that determines whether the audio signal matches a stored sound profile.

24. The system of claim 19 wherein the at least one additional sensor comprises an ambient light sensor.

25. The system of claim 24 wherein the threshold filter applied to signals received at the ambient light sensor determines whether a change in ambient light within a specified amount of time exceeds a predefined measurement.

26. The system of claim 19 wherein the at least one additional sensor comprises a camera.

27. The system of claim 26 wherein the threshold filter applied to signals received at the camera determines whether image data within the received signal substantially matches a reference image.

28. The system of claim 19 wherein the at least one additional sensor comprises an accelerometer.

29. The system of claim 28 wherein the threshold filter applied to signals received at the accelerometer determines whether movement data within the received signal substantially meets a stored movement criteria.

30. The system of claim 19 wherein the at least one other sensor comprises an ambient light sensor and a camera, and the threshold filter applied to signals received at the ambient light sensor determines whether a change in ambient light within a specified amount of time exceeds a predefined measurement and wherein the threshold filter applied to signals received at the camera determines whether image data within the received signal substantially matches a reference image.

31. The system of claim 19 wherein the time interval comprises a maximum time duration.

32. The system of claim 19 wherein the subset of the received signals comprises all of the received signals.

33. The system of claim 19 wherein the subset of the received signals comprises a minimum number of the received signals.

34. The system of claim 19 wherein interruption of the operation of the mobile device comprises halting execution of an application.

35. The system of claim 19 further comprising initiating an instance of an alternate application.

* * * * *